United States Patent [19]

Plunkett et al.

[11] 4,044,285
[45] Aug. 23, 1977

[54] METHOD AND APPARATUS FOR CONTROLLING VARIABLE SPEED, CONTROLLED CURRENT INDUCTION MOTOR DRIVE SYSTEMS

[75] Inventors: Allan Barr Plunkett; John Douglas D'Atre, both of Erie, Pa.

[73] Assignee: General Electric Company, Erie, Pa.

[21] Appl. No.: 605,848

[22] Filed: Aug. 19, 1975

[51] Int. Cl.² ............................................. H02P 5/40
[52] U.S. Cl. .................................... 318/227; 318/230; 318/231
[58] Field of Search ....................... 318/227, 230, 231

[56] References Cited

U.S. PATENT DOCUMENTS

| 3,500,158 | 3/1970 | Landau et al. | 318/227 |
|---|---|---|---|
| 3,512,067 | 5/1970 | Landau | 318/231 |
| 3,593,083 | 7/1971 | Blaschke | 318/227 |
| 3,700,986 | 10/1972 | Cushman et al. | 318/231 X |
| 3,796,935 | 3/1974 | Blaschke | 318/231 X |
| 3,805,135 | 4/1974 | Blaschke | 318/231 X |
| 3,824,437 | 7/1974 | Blaschke | 318/231 X |

*Primary Examiner*—Gene Z. Rubinson
*Attorney, Agent, or Firm*—A. S. Richardson, Jr.

[57] ABSTRACT

A new induction motor control method and system utilizes one more electric power inverters each supplying a separate induction motor with alternating current excitation power. The respective inverters preferably comprise auto-sequential commutated controlled current inverters. Direct current is supplied to each inverter in the system from a common direct current power supply preferably comprising a phase controlled rectifier circuit with individual current smoothing inductors connected in the direct current link to each power inverter for isolation purposes. A common operator controlled power level control module is provided for controlling the magnitude of the output current supplied from the common phase controlled rectifier to all of the inverters in parallel. Respective motor flux sensing means are provided for each induction motor for deriving individual feedback control signals representative of the flux developed by the respective induction motors. The flux feedback signal is summed with an input command value of a flux control signal in a suitable summing circuit, and the error signal is supplied through a suitable compensating circuit for regulating the flux level of the respective induction motors by individually controlling the frequency of the excitation current supplied to the stator windings of the motor by its associated inverter. In a preferred embodiment the actual electro-magnetic flux produced across the induction motor stator-rotor gap is sensed and fed back to the summing circuit for control purposes. This sensed actual value of motor flux signal also is utilized to derive an actual value of torque feedback control signal that is employed in controlling the magnitude of the direct current supplied by the common phase controlled rectifier to all of the inverters in parallel. It is also preferred to employ a phase lock-loop converter as the compensating circuit in the frequency control.

47 Claims, 11 Drawing Figures

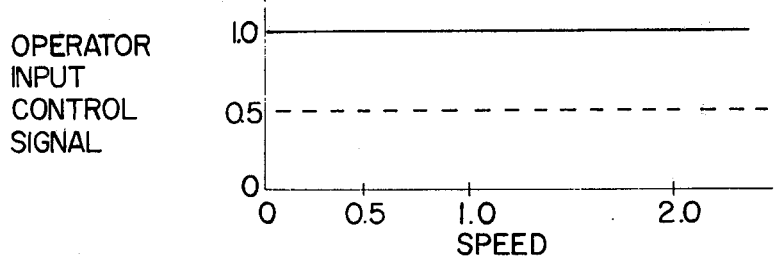
FIG. 7A — OPERATOR INPUT CONTROL SIGNAL
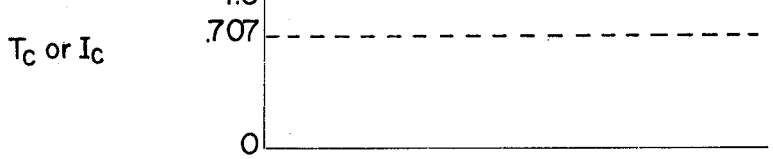
FIG. 7B — $T_c$ or $I_c$
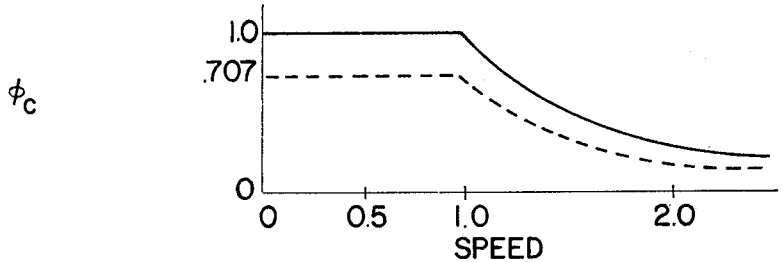
FIG. 7C — $\phi_c$
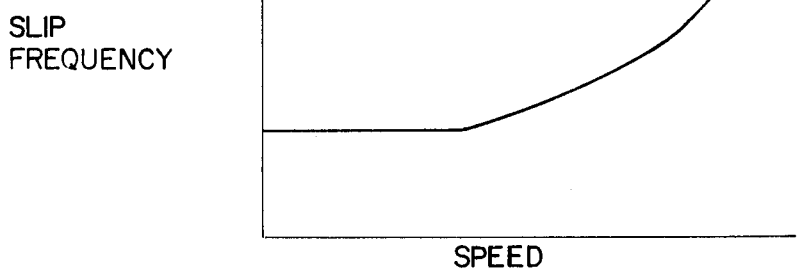
FIG. 7D — SLIP FREQUENCY
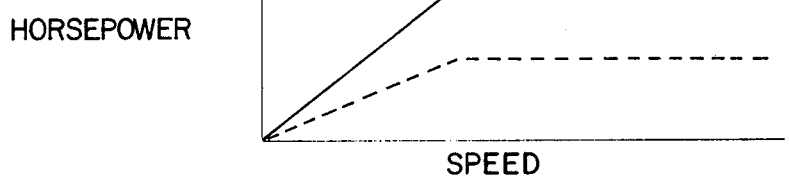
FIG. 7E — HORSEPOWER

METHOD AND APPARATUS FOR CONTROLLING VARIABLE SPEED, CONTROLLED CURRENT INDUCTION MOTOR DRIVE SYSTEMS

BACKGROUND OF THE INVENTION

This invention relates to a new and improved method and apparatus for controlling the operation of induction motor drive systems and in particular variable speed, current fed induction motor drive systems.

In current fed induction motor drive systems, the magnitude and the frequency of the alternating current that excites the stator windings of the motor are controlled, in contrast to systems of the voltage type wherein the magnitude and frequency of the applied alternating voltage are controlled. The controlled current is fed to the induction motor from the output terminals of suitable electric power conversion apparatus which is energized in turn by an available source of electric power, and the operation of the conversion apparatus is controlled by an associated control system so as to establish desired levels of current magnitude and frequency. Typically, the conversion apparatus comprises a phase controlled rectifier circuit whose input terminals are adapted to be coupled to a source of a-c power, an inverter whose output terminals are coupled to the stator windings of the induction motor, and a d-c link, including a current smoothing inductor or choke, connected between the respective d-c terminals of the rectifier circuit of the inverter. In such a system the magnitude of alternating current supplied to the motor can be controlled by retarding or advancing the "firing angle" of the controllable electric valves in the phase controlled rectifier circuit, and the frequency of this current can be controlled by appropriately varying the switching frequency of the controllable electric valves in the inverter.

By suitably controlling the magnitude and frequency of the excitation current in relation to the speed of the motor, the motor can be operated in a variety of modes, including constant torque and constant horsepower. For many applications it is useful to maintain the motor torque constant for motor speeds from zero up to a predetermined base speed at which the horsepower reaches a limit determined by the maximum power capability of the components in the inverter and rectifier or by the maximum power available from the source. If speeds above base speed are desired, the mode of operation must be changed to a constant horsepower mode wherein torque is reduced hyperbolically with increasing speed so as to keep the horsepower of the motor from exceeding its predetermined limit.

The torque of an induction motor depends on the amount of magnetic flux in the air gap between its stator and rotor and on the slip frequency therebetween. The effective slip frequency by definition is the difference between the frequency of the rotating flux wave in the air gap of the motor and the equivalent electrical frequency at which the motor shaft is rotating (i.e., motor speed). In steady state the frequency of air-gap flux rotation is the same as the stator excitation frequency (i.e., the frequency of the alternating current excitation which is supplied to the motor). The magnitude of air gap flux is generally proportional to the magnitude-to-frequency ratio of the stator voltage. At high torques in a controlled current induction motor control system, when motor current is no more than 30 to 45 electrical degrees out-of-phase with respect to voltage, there is a substantially direct relationship between the magnitude of alternating voltage at the stator terminals of the motor and the magnitude of direct voltage at the rectifier end of the aforesaid d-c link (i.e., at the d-c terminals of the rectifier circuit).

A constant torque operating mode can be advantageously obtained by maintaining the motor flux at a predetermined substantially constant level and by controlling the slip frequency in accordance with the desired torque as established by a variable torque command signal. As disclosed in the prior art (e.g., U.S. Pat. No. 3,863,121), constant flux is maintained by regulating the magnitude of stator current as a predetermined non-linear function of the torque command signal, which function is selected so that stator current will have the proper relation to slip frequency to maintain the aforesaid constant level of air gap flux in the motor regardless of its speed. With a relatively high slip frequency set by a correspondingly high torque command signal, and with constant flux, the stator voltage of the motor tends to increase with increasing speeds, thus necessitating a proportionate increase in the d-c voltage of the phase controlled rectifier circuit. Eventually a speed can be reached at which the firing angle of the rectifier valves is fully advanced and the d-c voltage is maximum, whereupon the current magnitude regulating loop becomes saturated. Since the current magnitude regulating loop is the stabilizing influence in the prior art control scheme, the system becomes unstable when the saturation point is reached.

One possible solution to the instability problem is to limit the maximum stator voltage to a level appreciably lower than the maximum voltage capability of the phase controlled rectifier circuit. A scheme for doing this has been disclosed in U.S. Pat. No. 3,769,564 wherein the slip frequency of the motor is increased proportionately with speed if the alternating voltage on the motor stator tends to exceed a predetermined limit. In this way, motor flux can vary inversely with speed above the base speed at which the voltage limit is reached, and consequently a relatively constant horsepower mode of operation is obtained. The difficulty with this solution to the stability problem is that it prevents the full power capabilities of the power source and of the phase controlled rectifier circuit from being realized, and it is subject to misoperation in the event of short-term reductions in source voltage. Additionally, the known controlled current inverter motor drive systems heretofore used have employed a separate phase controlled rectifier for each controlled current inverter/motor set, thereby, increasing the cost of the system greatly. To overcome these difficulties, the present invention was devised.

SUMMARY OF INVENTION

It is therefore a primary object of the present invention to provide a new and improved method and apparatus for improving the stability and control of operation of variable speed, controlled current inverter-induction motor drive systems.

Another object of the invention is to provide such an improved controlled system, wherein a plurality of controlled current inverter/motor sets can be excited from a single phase controlled rectifier whereby certain economies in the overall drive system can be achieved.

A further object of the invention is to provide an improved induction motor control system havng the above features, wherein the actual value of the motor flux produced across the stator-rotor gap of the induction motor is sensed and is employed in regulating the frequency of stator excitation current supplied to the induction motor by the controlled current inverter for stabilization purposes.

A still further object of the invention is to provide an induction motor control system having the above features and further including means for deriving an actual value of torque feedback control signal for controlling the magnitude of the direct current supplied to the inverter than then excites an associated, respective induction motor.

Still another feature of the invention is the provision of an improved induction motor control system having the above features and further including a phase lock-loop converter in the feedback path controlling the frequency of the excitation current supplied to each induction motor by its respective inverter.

In practicing the invention a new and improved induction motor control system is provided which includes at least one alternating current induction motor. Inverter means are coupled to and supply the induction motor with alternating current excitation. Direct current coupling circuit means are provided for coupling direct current to the input of the inverter means. Control means are included for controlling the magnitude of the direct current supplied over the direct current coupling circuit to the inverter means, and hence the magnitude of the alternating current excitation supplied by the inverter to the induction motor. The control means is in turn responsive to an operator controlled command means for controlling the magnitude of the direct current, and hence the amplitude of the current supplied by the inverter means to the induction motor to thereby control the torque developed by the motor.

Motor flux sensing means are provided for deriving a feedback control signal representative of the value of the motor flux being developed by the induction motor. Torque or power command means are included for supplying an input operator controlled signal representative of a desired value of motor flux. This input desired value of motor flux signal is summed together with the feedback actual motor flux signal in a summing circuit and an output flux error control signal is derived for regulating the flux level of the induction motor. The flux error control signal is supplied through a suitable compensating circuit to the inverter controls for controlling the frequency of the excitation current developed by the inverter and supplied to the induction motor so as to minimize the flux error. The motor flux sensing means preferably comprises means for sensing the actual electro-magnetic flux being produced across the induction motor stator-rotor gap and for deriving an actual value of flux signal representative thereof for use in the flux regulating loop of the control system. The direct current source preferably comprises a single phase controlled rectifier circuit for suppling a plurality of inverter-motor sets in common, with each having the above characteristics. The induction motors employed preferably comprise variable speed, variable current, three-phase induction motors, and the inverters preferably comprise auto-sequential commutated, controlled current power inverters.

In a preferred form of the invention torque feedback circuit means are included in the current magnitude regulating loop which determines the magnitude of the direct current supplied to the respective inverters. The torque feedback circuit means employs a current sensor for sensing the magnitude of the output current supplied from each inverter to its associated induction motor and combines this feedback current signal with the motor flux signal to derive an actual value of torque feedback control signal that is employed to control the operation of the phase controlled rectifier supplying direct current to the inverter. It is further desirable to employ a phase lock-loop converter in the frequency controls of the system for further improving the stability of the overall system.

These and other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

BRIEF DESCRIPTION OF DRAWINGS

FIG. 7A through 7E of the drawings illustrate operating characteristics of an exemplary command logic module useable with the control system of FIG. 1 together with the resultant response characteristics of the control system for the particular control program designed into the module.

DETAILED DESCRIPTION OF PREFERRED EMBODIMENTS

Figure 1:
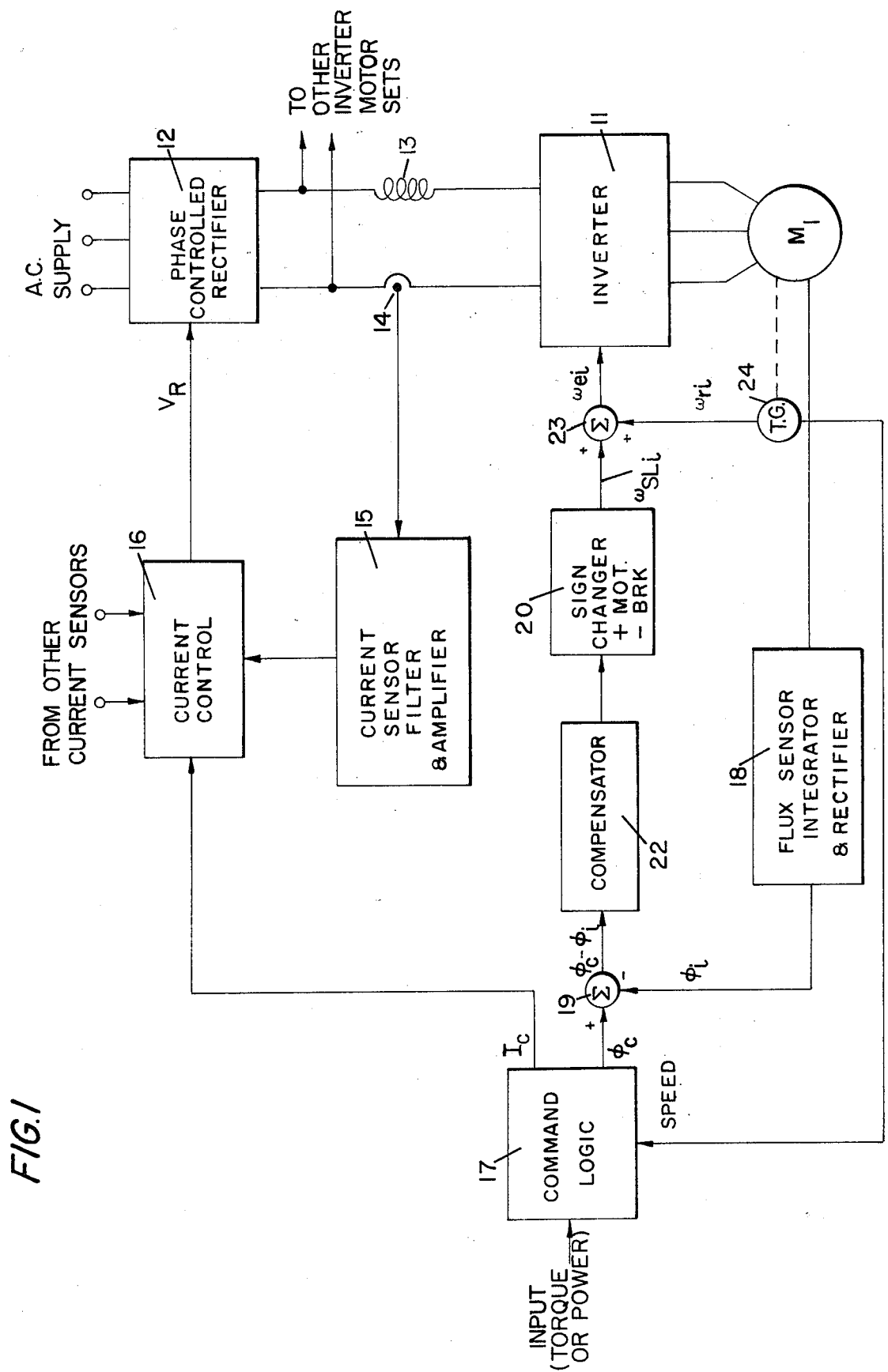
FIG. 1 is a schematic functional block diagram of a new and improved variable speed, current controlled induction motor drive system according to the invention.

FIG. 1 is a schematic functional block diagram of a variable speed, controlled current inverter driven induction motor drive system according to the invention. In FIG. 1 a conventional, three phase, squirrel cage alternating current induction motor is shown at $M_1$. The induction motor $M_1$ may be of any conventional, commercially available construction and may be connected in an overall motor drive system with a plurality of additional, similar induction motors (not shown). While the present invention is being described for use primarily in a multiple motor drive system, it is to be understood that the application of the invention is in no way restricted to the control of a plurality of induction motors in variable speed motor drive systems but could be employed to control the operation of any induction motor, including constant speed induction motor drive systems.

Figure 6:
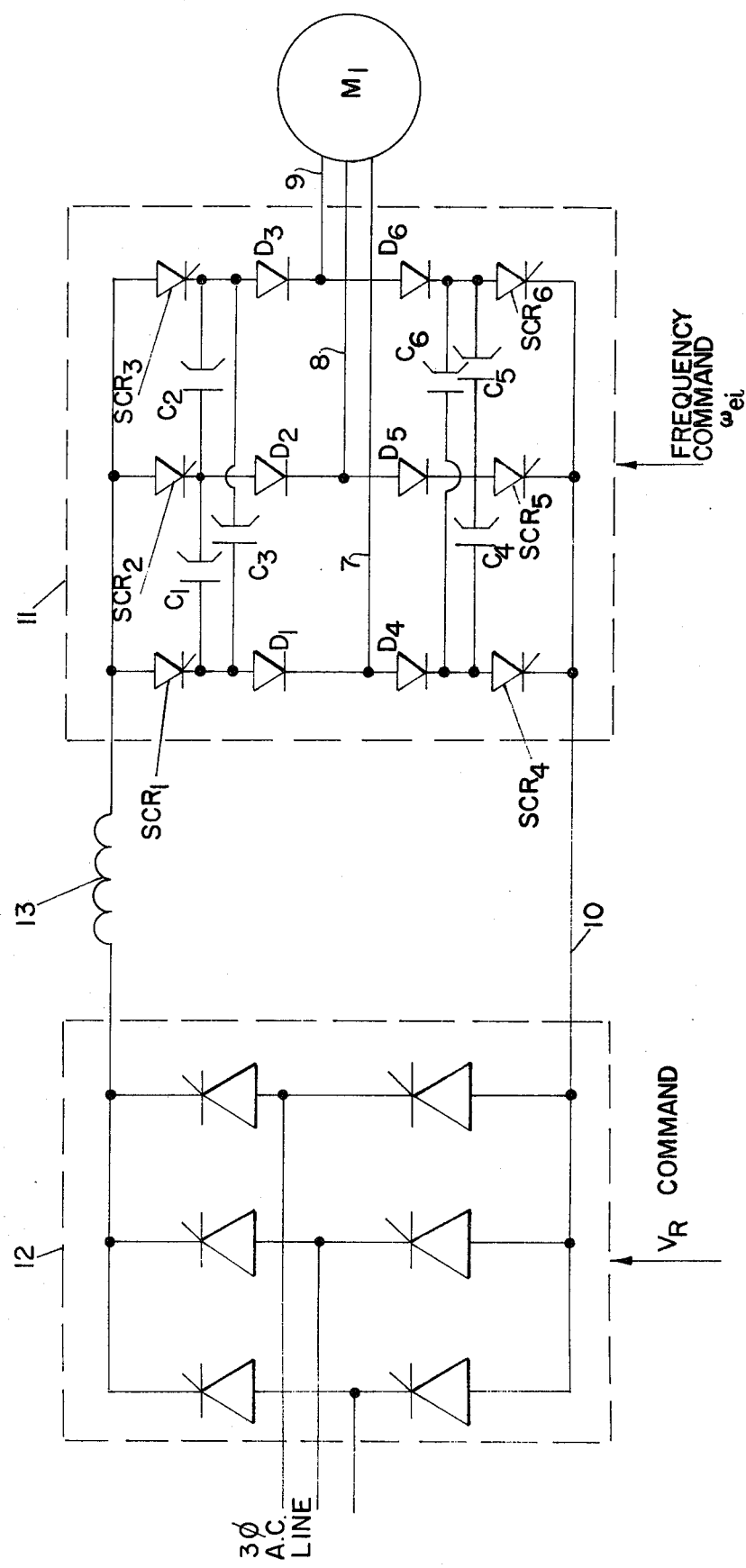
FIG. 6 is a schematic circuit diagram illustrating the construction of a preferred form of auto-sequential commutated, controlled current inverter used in the induction motor control systems and method comprising the present invention.

The induction motor $M_1$ has its stator windings excited from the output of a power inverter 11 which may comprise any known, conventional, commercially available power inverter such as any of those described in the textbook entitled, "Principles of Inverter Circuits" — B. D. Bedford and R. G. Hoft published by John Wiley & Sons, Inc. 1964 — Library of Congress, Catalogue Card No. 64-20078. However, it is preferred, in practicing the present invention, to employ an autosequential commutated controlled current inverter as the inverter element 11 in all of the embodiments of the present invention to be described hereafter. One suitable form of a known, auto-sequential commutated controlled current inverter for use in practicing the invention, is illustrated in FIG. 6 of the drawings, and will be described more fully hereafter.

The inverter 11 is supplied from the output of a common phase controlled rectifier 12 of conventional construction which in turn is supplied from an available source of alternating current. The phase controlled rectifier 12 is designed to apply a direct voltage of variable magnitude to a d-c bus feeding a plurality of inverter/motor sets of the overall traction motor drive system in parallel, and it is appropriately rated for this function. Each inverter/motor set is connected to the output of the phase controlled rectifier 12 through a d-c link comprising a suitable isolating choke 13 and, if desired, a current sensor such as shown at 14. The isolating choke 13 reduces the ripple in the d-c link current to a desired low percent, and it prevents interaction of the several power inverters on each other and on phase controlled rectifier 12 by effectively filtering out any line or motor frequency currents that might appear on the direct current supply lines between the phase controlled rectifier 12 and inverters 11.

The current sensor 14 is connected to the input of a current sensor filter and amplifier network 15 that in turn has its output supplied as one of the inputs to a current control circuit 16. The outputs from corresponding current sensors for the other inverter/motor sets also are supplied to the current control 16 which averages all of the current sensor inputs to derive an average actual value current level control signal. This average actual value current level control signal is then compared to a command value of current control signal supplied from a command logic module 17, and an output error control signal $V_R$ is derived. Control signal $V_R$ then is used in controlling the firing angles of the controllable electric valves in the phase controlled rectifier 12 in a well known manner to thereby control the average magnitude of the voltage at the d-c terminals of the rectifier, which voltage is applied to all of the inverter/induction motor sets in common. With this arrangement, the magnitude of the excitation current supplied to the induction motor $M_1$ and its counterparts in the motor drive system, can be effectively controlled by an operator of the system to thereby effectively control the torque developed by all of the motors in common.

In order to insure stable operation of the control system illustrated in FIG. 1, a flux sensor, integrator, and rectifier network shown at 18, is connected to sense the magnitude of the actual electro-magnetic flux produced across the stator-rotor gap of each respective induction motor such as $M_1$. The flux sensor, integrator and rectifier 18 derives an output actual value of flux signal $\phi_i$ that is supplied as one input to a summing circuit 19. The summing circut 19 has supplied to it as a second input, an input command value of flux control signal $\phi_c$ derived from an operator controlled command logic module 17. Summing circuit 19 operates to combine the measured actual value of flux signal $\phi_i$ with the command value of flux signal $\phi_c$ and to derive an output flux error signal $(\phi_c - \phi_i)$ that is supplied as the input to a compensator network 22. The compensator network 22 provides a gain plus appropriate compensation to the flux error control signal and derives an output slip frequency signal $\omega_{sli}$ which is relatively positive during motoring and relatively negative during braking, as determined by a suitable sign changer 20.

The slip frequency signal $\omega_{sli}$ is supplied as one input to a second summing circuit 23 having a second input connected to the output from a tachometer generator 24 or other similar motor speed sensor device that derives a rotor frequency signal $\omega_{ri}$ representative of the actual speed of the motor $M_1$. The second summing circuit 23 combines the actual speed signal $\omega_{ri}$ with the slip frequency signal $\omega_{sli}$ to derive an output frequency controlling signal $\omega_{ei}$ for controlling the frequency of operation of the inverter 11. In steady state operation the signal $\omega_{sli}$ corresponds to the actual slip frequency in the motor, and it has a value that results in whatever stator excitation frequency is necessary to achieve equality between the feedback and the command values of motor flux (i.e., zero flux error signal) at whatever speed the motor is running.

With the above described arrangement, control of the overall system is achieved by individually controlling the frequency of the impressed stator excitation current in a manner which closely regulates the flux level in each induction motor such as $M_1$, and by controlling the common phase controlled rectifier output voltage to maintain a desired average stator excitation current magnitude and hence torque level for all of the motors of the system in common. Thus, it will be seen that the amplitude of the impressed stator current supplied to each of the induction motors such as $M_1$ in the drive system, is commonly controlled by varying the phase controlled rectifier output voltage so as to maintain a desired total torque level from all of the induction motors. Further control and stabilization of the system is achieved by adjusting the frequency of the impressed stator excitation current for each respective induction motor $M_1$ in such a manner as to regulate the flux level of each motor to an individually adjusted commond value required for stable operation of that particular motor as determined by its design parameters. Thus, it is seen that with the system of FIG. 1, a signal indicative of the actual flux level of each induction motor $\phi_i$ is compared with a desired or command flux level signal $\phi_c$ for that particular motor at the operating point in question. Any error signal $\phi_c - \phi_i$ is applied to the control compensating network 22 to determine a desired value slip frequency $\Omega_{sli}$ for the operating condition of the motor. This slip frequency signal is added to a signal $\omega_{ri}$ which is indicative of each motor's true rotor speed, and results in deriving the inverter frequency controlling signal $\omega_{ei} = \omega_{sli} + \omega_{ri}$.

The values of the flux control signal $\phi_c$ and of the current control signal $I_c$ are respectively determined by the command logic module 17 in response to a single operator controlled input signal representative of a desired motor torque or horsepower. The command logic module 17 is suitably constructed and arranged to vary and to coordinate the respective values of the flux and current control signals in accordance with a predesigned schedule that will enable the motor to exhibit a desired speed-torque characteristic. To accomplish this, the command module 17 is supplied with a feedback signal representative of the actual speed of the motor as sensed by the tachometer generator 24. It should be kept in mind that any predetermined schedule can be built into the command module 17 depending upon the desired operating characteristics to be exhibited by the motors being controlled. If desired, manually operated potentiometers could be employed to develop the command signals $\phi_c$ and $I_c$. However, by way of example, the command module 17 is designed to provide the schedule shown in FIG. 7A through 7E wherein the motor $M_1$ being driven runs with constant torque for speeds between zero and 1.0 per unit (base speed) and with constant horsepower for speeds above 1.0 per unit. The solid-line traces in FIG. 7 show the magnitude vs. speed relationships of the indicated signals and parameters for a condition wherein the operator controlled input signal is adjust to a desired torque level of 1.0 per unit torque. It will be observed that the stator current signal $I_c$ remains substantially constant throughout the illustrated range of speeds, whereas the motor flux signal $\phi_c$ is maintained constant only below the 1.0 per unit speed and decreases hyperbolically with increasing speed above thes cornerpoint. The dotted line traces illustrate the characteristics for an operator input control signal of 0.5 per unit torque. Known function generating techniques and circuits can be used to construct a command logic module 17 which will provide output signals in accordance with the schedule depicted in FIGS. 7A, 7B, and 7C or in accordance with any other desired control strategy, as will be apparent to those persons skilled in the art. Another suitable technique and circuit construction that can be used to develop the desired $\phi_c$ and $I_c$ signals is illustrated in copending U.S. Pat. No. 3,899,725. "Braking Effort Control", A. B. Plunkett (filed Feb. 25, 1974 and assigned to the General Electric Co.). This copending application discloses a method of deriving a current command in terms of speed and voltage using a multiplier, a divider, and a highest value selector.

In the motor control system described above, stable operation of the alternating current induction motors is achieved, without relying on the rectifier voltage control, by virtue of controlling stator excitation frequency as a function of motor flux. A considerable advantage of this system is that a number of controlled current inverter/motor sets can be operated in parallel from a single, common phase controlled rectifier circuit, thereby achieving considerable economy and efficiency in the utilization of the phase controlled rectifier power components during operation. A further advantage of the system is that operation is not limited to a region of the phase controller rectifier operating characteristics where voltage variation of the rectifier output is available for stabilization purposes, and the phase controlled rectifier can be operated with the firing angle of its controllable electric valves fully advanced for maximum voltage. These advantages are achieved by reason of the fact that stable operation of the system is separately maintained by control of the flux level of each motor through the respective frequency regulation feedback channel for each motor.

The overall effect of the above enumerated advantages is that the overall drive system can be operated with the voltage controlling feedback channel of the system essentially non-responsive to system changes, thereby allowing the system to be run at saturated voltage levels. Stabilization of the overall system is achieved by regulating the flux level of the individual motors through the feedback control of the frequency of the excitation currents supplied to the stators of the individual motors. This characteristic makes it possible to employ a single phase controlled rectifier circuit to supply a power inverter/motor sets along with its attendant economies and efficiency in operation while assuring stable operation of all the motors of the drive system. It also enables all components of the system, especially in the inverter, to be used at their maximum ratings, and it ensures stable operation of the system in the event of transient reductions or dips in the source voltage. Furthermore, the ability to operate the motor control system with the phase controlled rectifier turned full on, without jeopardizing system stability, offers an opportunity for power factor and telephone interference improvements.

A still further advantage of the above described motor control system is its versatility. Torque, being dependent on both current and flux, can be controlled by varying either the current control signal $I_c$ or the flux control signal $\phi_c$ alone or by varying both of these signals in concert. Which of these alternatives is selected in practice will depend on interrelationships of the components and of the parameters of the overall system. For example, if the system utilizes an inverter whose communicating capability varies with load current, the possibility of erratic commutation at relatively low torque and high speed imposes a constraint on using current alone to control torque. On the other hand, since the heat generated in the motor and the losses in the system are functions of the square of current, it may be undesirable to use flux alone to control torque and to run at relatively low levels of torque with constant current.

The particular control strategy that is selected will determine the construction of the command logic module 17. By way of example, one possible control strategy has been illustrated in FIG. 7 where the dotted line traces depict a typical schedule of the current and flux control signals $I_c$ and $\phi_c$ for various speeds upon reducing the operator controlled input signal to 0.5 per unit torque. It will be apparent that the current control signal is proportional to the square root of the input signal. The flux control signal is also proportional to the square root of the input signal, but for speeds over a certain cornerpoint speed (which is shown equal to 1.0 per unit but which could be higher or lower than this speed), $\phi_c$ is additionally varied as an inverse function of speed. By using the square root relationships (or their equivalents), torque is maintained directly proportional to the value of the input signal and varies inversely with speed above the cornerpoint. It should be noted that the slip frequency vs. speed characteristic of the motor does not vary with the input signal, and for any given speed the slip frequency remains the same at 0.5 per unit torque as at 1.0 per unit torque.

As stated above, the power inverter 11 employed in all of the embodiments of the invention, preferably is an auto-sequential commutated, controlled current inverter. FIG. 6 is a detailed schematic circuit diagram of a preferred form of auto-sequential commutated, controlled current inverter for use in practicing the invention. In FIG. 6, a phase controlled rectifier circuit is shown at 12 and comprises a conventional, known phase controlled rectifier of the type described in Chapter 3 of the above referenced "Principles of Inverter Circuits" by Bedford ad Hoft. Alternatively, a common direct current chopper of the type disclosed in Chapter 10 of the above referenced Bedford and Hoft text, or in Chapter 13 of the General Electric SCR Manuel cited hereafter, could be employed to provide controlled magnitude direct current to the inverter/motor sets. Controlled magnitude direct current produced at the output of phase controlled rectifier 12 is supplied through the choke 13 and conductor 10 to the auto-sequential commutated control current inverter 11.

Since the induction motor $M_1$ preferably comprises a three phase squirrel cage induction motor, the power inverter 11 is comprised by three separate series branch sub-circuits for supplying the three phase windings with each branch sub-circuit being connected in parallel circuit relationship across the direct current choke 13 and conductor 10. The first series branch circuit is comprised by a controllable electric valve (e.g., a silicon controlled rectifier) $SCR_1$ and diode $D_1$, diode $D_4$ and valve $SCR_4$ connected in series aiding relationship. The second branch sub-circuit is comprised by $SCR_2$, $D_2$, $D_5$ and $SCR_5$ connected in series aiding relationship. And the third series branch sub-circuit is comprised by the $SCR_3$, $D_3$, $D_6$, and $SCR_6$ connected in series aiding relationship. Motor input leads connected to the respective stator windings (not shown) of the three phase motor $M_1$, are shown at 7, 8, and 9 and are connected respectively to the juncture of the diode $D_1$ with diode $D_4$, the juncture of diode $D_2$ with diode $D_5$ and the juncture of diode $D_3$ with diode $D_6$. Commutating capacitors $C_1$ through $C_6$ are provided for sequentially commutating off a previously conducting SCR upon turn-on of the next succeeding SCR in the string. For this purpose, commutating capacitor $C_1$ is inter-connected between the juncture of the cathode of $SCR_1$ with the anode of diode $D_1$ and the juncture of the cathode of $SCR_2$ with the anode of diode $D_2$. Similarly, commutating capacitor $C_2$ is connected between the juncture of the cathode of $SCR_2$ with the anode of diode $D_2$ and the juncture of the cathode of $SCR_3$ with the anode of diode $D_3$. Commutating capacitor $C_3$ is connected between the juncture of the cathode of $SCR_1$ with the anode of diode $D_1$ and the juncture of the cathode of $SCR_3$ with the anode of diode $D_3$. The communicating capacitors $C_4$ through $C_6$ are similarly inter-connected with respect to $SCR_4$–$SCR_6$, and diodes $D_4$–$D_6$.

In operation at a frequency determined by the frequency controlling signal $\omega_{ei}$ appearing at the output of the summing circuit 23 of FIG. 1, or by some familar frequency controlling signal derived according to the invention, the inverter valves are cyclically fired in the following sequence: $SCR_1$, $SCR_6$, $SCR_2$, $SCR_4$, $SCR_3$, $SCR_5$, $SCR_1$. Assuming a delta connection for the motor stator windings, (although a Wye connection also would work) then it can be considered that excitation current will be supplied first to the phase A winding of motor $M_1$ through $SCR_1$, diode $D_1$, conductor 7, conductor 9, diode $D_5$ and $SCR_5$. Upon firing $SCR_6$, the voltage across commutating capacitor $C_5$ will cause $SCR_5$ to turn-off automatically, and later upon firing $SCR_2$ the voltage across commutating capacitor $C_1$ will cause $SCR_1$ to turn off automatically. Thus, it will be seen that excitation current flow through one phase winding automatically will be terminated and a new current path established through the next phase winding by way of $SCR_2$, diode $D_2$, conductor 8, the next phase winding, conductor 9, diode $D_6$ and $SCR_6$. In a similar manner, after a suitable conduction interval, $SCR_4$ is gated on with automatic and sequential turn-off of $SCR_6$, excitation of the third phase winding and extinction of conduction flow through the said next phase winding. The frequency of turn-on and auto-sequential turn-off of the SCR's in this manner corresponds to the frequency of operation of the power inverter 11 and determines the frequency of the excitation current supplied to the stator windings of motor $M_1$. For a more detailed description of a suitable auto-sequential Commutated controlled current inverter, reference is made to copending U.S. Pat. No. 3,980,941 filed June 18, 1975 entitled "Improved Reset Circuit For Auto-Sequential Commutated Inverter" by Ronald F. Griebel, assigned to the General Electric Company.

Gate trigger circuits (not shown) are provided for converting the frequency controlling signal $\omega_{ei}$ obtained from the output of the summing circuit 23 into a suitable train of cyclic firing signals for turning-on the respective SCR's as described briefly above. Suitable gate trigger circuits for this purpose are described in Chapter 4, "Gate Trigger Characteristics, Ratings and Methods" of the SCR Manual, 5th edition, published by The Semi-Conductor Products Department of the General Electric Company located at Electronics Park, Syracuse, New York-copyrighted 1972.

Figure 2:
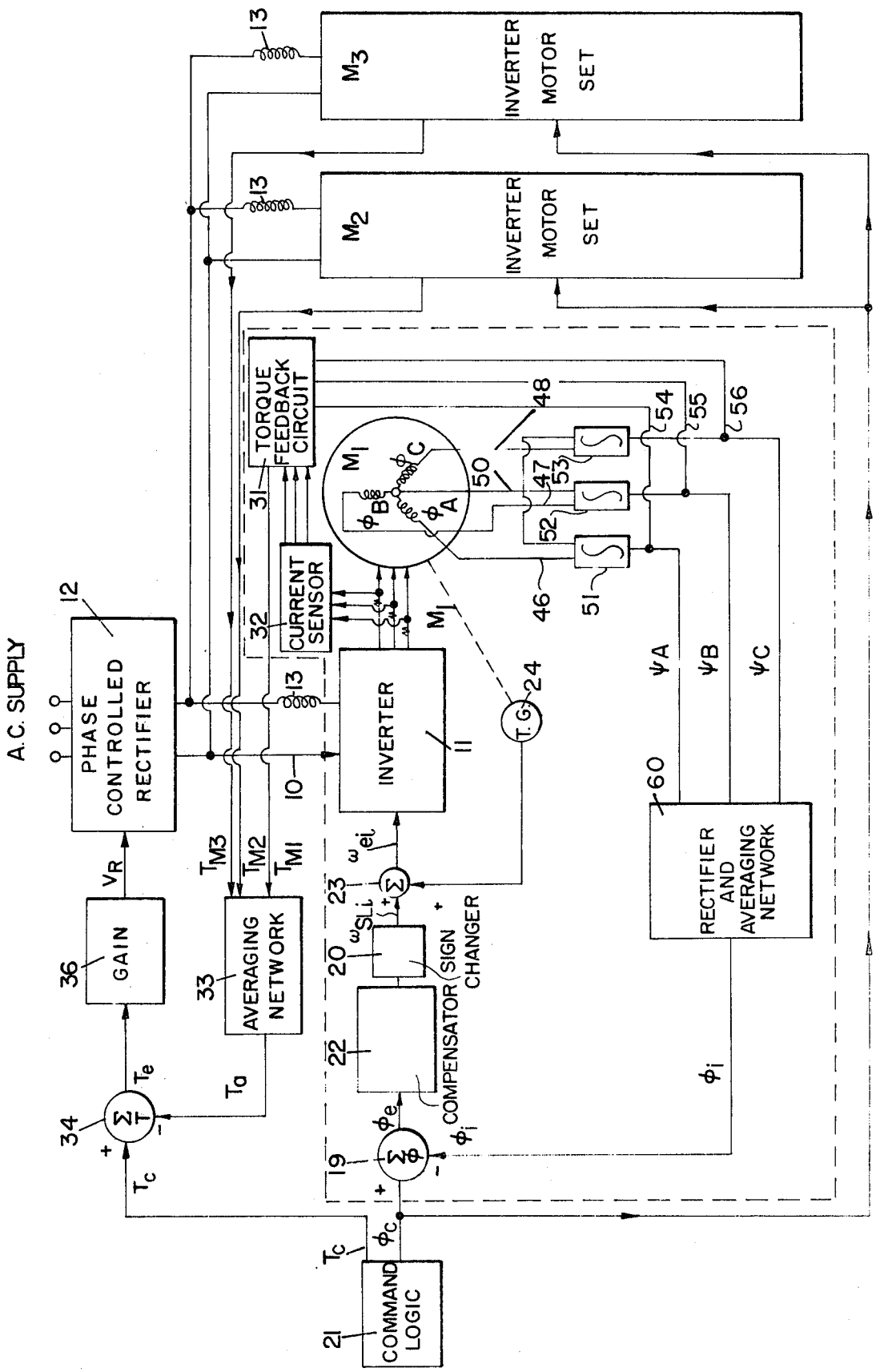
FIG. 2 is a schematic functional block diagram of an alternative form of the invention wherein a system employing a torque feedback circuit is utilized to variably control the magnitude of the direct current supplied from a common phase controlled rectifier to a plurality of current controlled, inverter/motor sets according to the invention.

FIG. 2 of the drawings is a schematic functional block diagram of another form of induction motor control system constructed in accordance with the invention. In FIG. 2, all three inverter/motor sets $M_1$, $M_2$, and $M_3$ of a motor drive system have been illustrated in functional block diagram form. Because the control elements associated with each of the additional inverter/motor sets $M_2$ and $M_3$ are identical in construction and operation to those employed with the induction motor $M_1$, motors $M_2$ and $M_3$, hence their respective inverters and frequency controlling channels have not been illustrated in detail.

Induction motor $M_1$ has its stator winding (not shown) excited from the output of an inverter 11 which again preferably comprises an autosequential commutated, controlled current inverter of the type shown in FIG. 6 of the drawings. The inverter 11 in turn is supplied with a variable voltage, direct current obtained from the output of phase controlled rectifier 12 through the choke 13 and conductor 10. A plurality of motor flux sensing coils $\phi_A$, $\phi_B$, and $\phi_C$ are arranged in the induction motor stator in a manner so as to sense the actual value of the electromagnetic flux being produced across the stator-rotor gap of the motor. For a more detailed description of the construction and manner of operation of the motor flux sensing winding, reference is made to copending U.S. application Ser. No. 526,613 filed Nov. 20, 1974 entitled "Apparatus For Regulating Flux In An A. C. Motor", A. B. Plunkett and J. Franz, assigned to the General Electric Company. The output flux signals obtained from the motor flux sensing windings, $\phi_A$, $\phi_B$, and $\phi_C$ are supplied through integrating circuits 51, 52, and 53 to a rectifier and averaging network 60 which derives an output signal $\phi_i$ representative of the integrated and average actual value of the electromagnetic flux appearing across the rotor-stator gap of the induction motor $M_1$. This actual value of flux signal $\phi_i$ is then supplied as one of the input signals to a first summing circuit 19.

The first summing circuit 19 also has supplied to it an input command value of flux obtained from a command logic module 21 and operates to compare the command value of flux to the measured actual value of flux, and to derive an output flux error signal $\phi_e$. The flux error signal is supplied through a conventional, proportional plus integral compensator circuit 22 and sign changer 20 that derives at its output a slip frequency signal $\omega_{sli}$ representative of a desired value of slip frequency for the operating condition of the motor $M_1$. The slip frequency signal $\omega_{sli}$ is supplied to the second summing circuit 23 in conjunction with an actual motor speed signal $\omega_{ri}$ derived from the output of a tachometer generator 24 or other suitable speed sensing device. The second summing circuit then adds the actual motor speed signal $\omega_{ri}$ to the desired value of slip frequency signal $\omega_{sli}$ to drive at its output a frequency command signal $\omega_{ei}$ that is employed to control the frequency of operation of the power inverter 11. In this manner the flux level produced by the motor $M_1$ is regulated to maintain a stable operating condition for the motor $M_1$. Operation of each of the other individual inverter/motor sets $M_2$ and $M_3$ is also stabilized in a similar manner.

In order to control the power level or torque developed by the motors $M_1$, $M_2$, and $M_3$ shown in FIG. 2, each motor includes a respective torque feedback circuit 31. The torque feedback circuit 31 has one set of inputs supplied from the output of the flux signal integrators 51, 52, and 53 through conductors 54, 55, and 56, respectively. In addition, the torque feedback circuit 31 has a second set of input terminals supplied with input signals from a current sensor 32 connected to sense the actual value of the stator excitation current supplied to the stator windings of the respective induction motors, and to derive output signals representative of the actual values of the stator excitation winding current. The torque feedback circuit 31 functions to combine the sensed actual value of current signals with the respective sensed actual value of flux signals and to derive at its output a sensed actual value of torque signal, such as $T_{m1}$. For a more detailed description of the construction and manner of operation of the torque feedback circuit 31, reference is made to copending U.S. Ser. No. 568,120; filed Apr. 14, 1975; entitled "Torque Regulating Induction Motor Control System"; A. B. Plunkett, inventor, assigned to the General Electric Company.

The sensed actual value of torque feedback signals $T_{M1}$, $T_{M2}$, and $T_{M3}$ from all of the inverter/motor sets are supplied to an averaging network 33 which derives an output, average value, actual torque feedback signal $T_a$ that is supplied as one of the inputs to a torque summing circuit 34. The torque summing circuit 34 also has supplied to it an input command value of torque control signal $I_c$ from the command logic module 21, and it operates to combine the two input torque signals and derive at its output a torque error signal $T_e$. The torque error signal $T_e$ is then supplied through a conventional proportional control compensating circuit 36 to derive a voltage control signal $V_R$ that is applied to the phase controlled rectifier 12 for controlling the output voltage of the rectifier 12 and hence the magnitude of the direct current supplied to the inverter/motor sets $M_1$, $M_2$, and $M_3$.

During operation of the system shown in FIG. 2, the flux sensing elements 46 through 60 derive a sensed actual value of electromagnetic motor flux that is compared with a command value of motor flux signal for the operating condition of the motor in question, and derives through the medium of the feedback circuit comprised by the summing circuits 19 and 23 and compensating circuit 22, a frequency controlling signal $\omega_{ei}$ for application to the controls of the inverter 11. In this manner, the stator-rotor electromagnetic flux levels of the respective motors, are maintained at some predetermined value for the particular operating condition of the motor. Independently of this stabilizing regulatory action applied through the frequency regulating feedback channel, the torque feedback circuits for each of the inverter/motor sets derives a sensed actual value of torque feedback control signal that is applied to the summing circuit 34 in the voltage control channel. The sensed actual value of torque feedback signal is then combined with a command value of torque signal $I_c$ and the error is supplied through a compensating network to derive a voltage controlling input signal for controlling the operation of the phase controlled rectifier 12 independently of the stabilizing effect achieved on each of the induction motors $M_1$, $M_2$, and $M_3$ by their respective frequency regulating feedback control channels.

The motor control systems shown in FIGS. 1 and 2 and described above perform satisfactorily under steady state conditions. However, they may respond inaccurately to transient conditions that cause a relatively sudden change in the value of the flux error signal $\phi_e$ and hence of the frequency controlling signal $\Omega_{ei}$. In the event of such a transient, a discrepency tends to develop between the operating frequency of the inverter 11 (i.e., the actual frequency of the alternating current supplied to the motor M1) and the true frequency of flux rotation in the rotor-stator gap of the motor. In order to anticipate and to negate the effects of such a discrepency, additional compensating circuit means can be provided in the frequency controlling feedback channel of the system. Preferably as is shown in FIG. 3, the additional compensating circuit means is in the form of a phase lock-loop converter.

Figure 3:
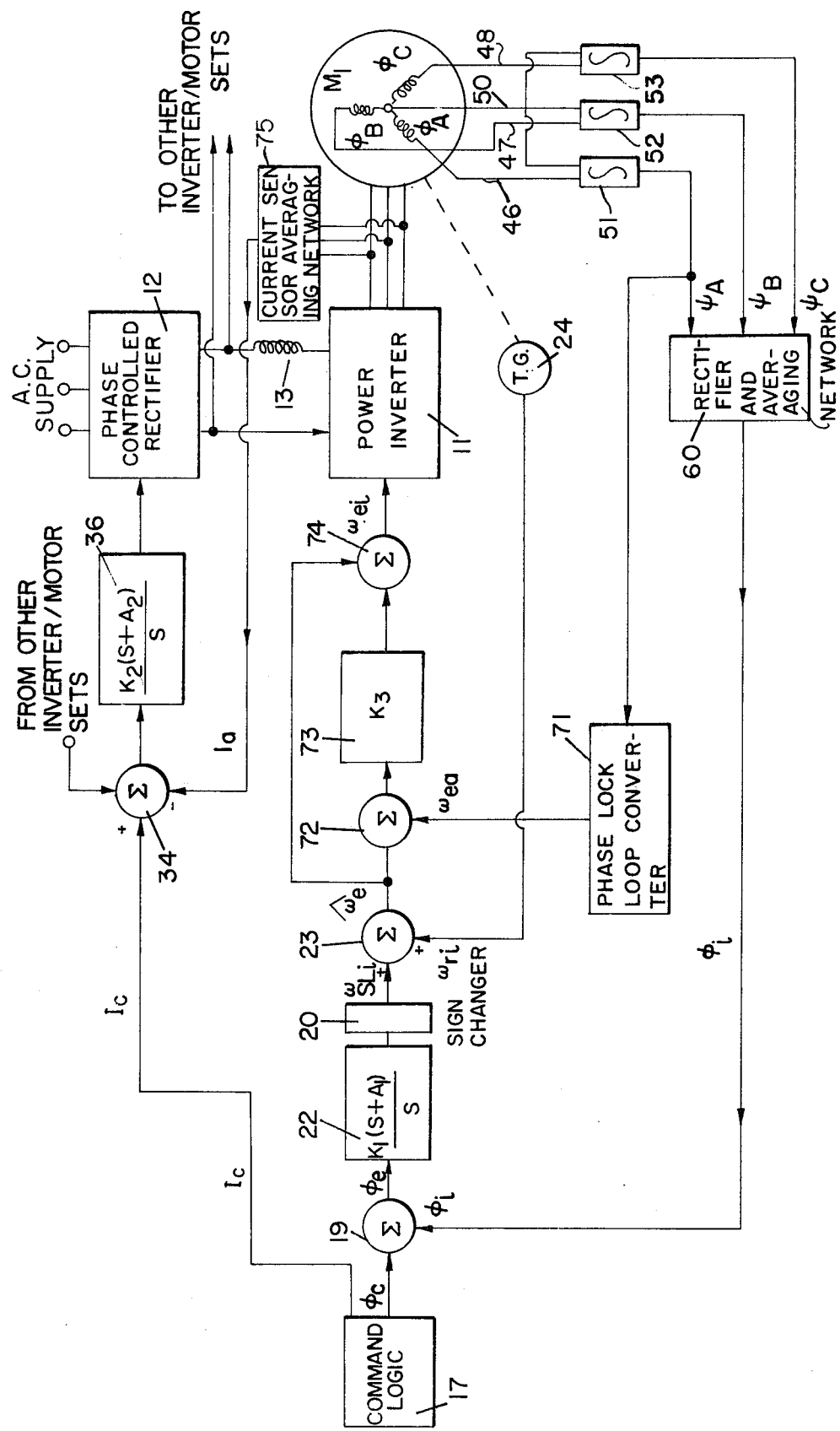
FIG. 3 is a schematic functional block diagram of still a different control system according to the invention employing a respective current sensor for sensing the output current supplied from each power inverter of the system together with the use of a phase lock-loop converter in the frequency controlling feedback path of the control system.

In FIG. 3, like parts of the control system shown in FIG. 2, are identified with the same reference numeral and operate in the same manner. Hence, it will be seen that the induction motor $M_1$, as well as the other induction motors included in the traction drive system, include motor flux sensing coils $\phi_A$, $\phi_B$, and $\phi_C$ for sensing the actual value of the electromagnetic motor flux produced across the rotor-stator gap of the motors. The sensed motor flux signals derived by the sensing coils $\phi_A$ through $\phi_C$ are supplied through integrating circuits 51 through 53 to a rectifier and averaging network 60. Network 60 then supplied an output signal $\phi_i$ representative of the sensed actual motor flux as one of the inputs to the summing circuit 19. As described previously with respect to FIG. 2, the summing circuit 19 also has supplied to it an input command value of flux control signal $\phi_c'$ from a command logic module 17 and operates to derive a flux error signal $\phi_e$. The flux error signal $\phi_e$ is supplied through a conventional compensating circuit 22 which derives at its output a signal $\omega_{sli}$ representative of a desired value of slip frequency for the induction motor $M_1$ under the operating conditions then prevailing. This slip frequency signal $\omega_{sli}$ is combined with a rotor frequency signal $\omega_{ri}$ obtained from the output of a tachometer generator 24 or other suitable speed sensor in a second summing circuit 23 that derives at its output a desired stator excitation frequency control signal $\hat{\omega}_e$.

The output signal appearing at the output of any one or more of the integrator circuits 51 through 53 is picked off and supplied as an input signal to a phase lock-loop converter circuit 71. Alternatively, the input of circuit 71 could be taken directly from the voltage across the conductors 46–48. The phase lock-loop converter circuit 71 may comprise any conventional known phase lock-loop converter circuit of the type described in greater detail in an article entitled, "Phase-locked loops", appearing in the proceedings of the I.E.E.E., volume 63, No. 2, Feb. 1975, pages 291–306. The phase lock-loop converter circuit includes within it a suitable phase detector and voltage controlled oscillator. The phase detector compares the phase of the input signal $\phi_A$ supplied from the output of one of the flux signal integrators 51 to the phase of the voltage controlled oscillator signal, and derives an output error signal $\omega_{ea}$ which is filtered and applied as a controlling voltage to the voltage controlled oscillator. The frequency of the voltage controlled oscillator is thereby changed in a direction so as to reduce the phase difference error of the input signal $\phi_A$ from the motor flux integrator circuit 51 and the output voltage signal of the voltage controlled oscillator. The output error signal $\omega_{ea}$ supplied to the voltage controlled oscillator is representative of the frequency of rotation of the motor flux, and it is supplied as one of the input signals to a third summing circuit 72.

The third summing circuit 72 compares the desired stator excitation frequency control signal $\hat{\omega}_e$ appearing at the output from the second summing circuit 23, to the actual flux frequency signal $\omega_{ea}$ supplied from the phase lock-loop converter circuit 71, and derives an output frequency error signal that is supplied to a compensator 73 having a gain $K_3$. The compensated frequency error signal is then supplied as one of the inputs to a fourth summing circuit 74 along with the desired frequency controlling signal $\hat{\omega}_e$ to derive at the output an actual alternating current frequency control signal $\omega_{ei}$ for application to the inverter circuit 11 for controlling its frequency of operation. The compensators 22 and 73 are conventional in construction and operation and are employed in a known manner to correct and compensate for nonlinearities and lag characteristics that otherwise might be introduced into the feedback system. If the compensator 73 were provided with an integrating characteristic, the fourth summing circuit 74 would be omitted.

For power controlling purposes, a conventional current sensor and averaging network 75 is connected to sense the magnitude of the current being supplied by inverter 11 to the stator windings of the induction motor $M_1$, and to derive at its output an average actual value of sensed motor current. This sensed, average actual value of motor current is supplied as one of the inputs to a current summing circuit 34 that has supplied to a second input, a command value of a motor current control signal $I_c$ supplied from command logic module 17. Additionally, summing circuit 34 has supplied to other input terminals, the feedback, sensed average of motor current signals for each of the other motors in the drive system. These signals are summed with the input command value of motor current signal to derive at the output of the summing circuit 34 a control signal representative of the desired value of motor current for all of the motors in the traction drive system. This desired value of motor current control signal is supplied through a compensating circuit 36 of conventional construction to the input of the phase controlled rectifier 12 for controlling its operation in comformance with the compensated and corrected value of motor current to be supplied to each of the induction motors in common by the phase controlled rectifier 12.

During operation, the current sensing and feedback path comprised of the elements 75, summing circuit 34 and compensation circuit 36, function to control the torque or power level developed by the motors by controlling the output voltage of the controlled rectifier 12 which is applied to all of the power inverter/induction motor sets in the drive system. Simultaneously, the frequency of the excitation current supplied to the stator windings of each induction motor is independently controlled through the flux feedback control channel in order to maintain the motor flux of each motor at some predetermined value appropriate for the operating condition of that motor. This is achieved in the system of FIG. 3 first by feedback of the sensed actual value of the flux through summing circuit 19, compensator 22, and the second summing circuit 23, to derive the desired stator excitation frequency signal $\hat{\omega}_e$ as described previously.

In the event of a rapid deviation of the flux error signal $\phi_e$ from its minimum or zero value, the value of the desired stator excitation frequency signal $\hat{\omega}_e$ is changed correspondingly. But a corresponding change in the actual stator excitation frequency would not be spontaneously tracked by the rotating flux wave in the stator-rotor gap of the motor. Therefore the frequency of the alternating current supplied to the motor is transiently altered by an extra amount which is greater than the amount of frequency change required for subsequent steady state operation with a zero flux error signal. In FIG. 3 this is provided for by a second frequency regulating loop wherein a signal $\omega_{ea}$ indicative of the actual frequency of the air gap flux is compared with the desired frequency signal $\hat{\omega}_e$ to derive a frequency error signal indicative of any differece therebetween. This frequency error signal is compensated and recombined with the desired frequency signal in the fourth summing circuit 74 to form the actual alternating current frequency signal $\omega_{ei}$ that is used to control the frequency of operation of the inverter 11. As a result, the switching frequency of the inverter is transiently increased or decreased as necessary to reduce the frequency error signal to zero so that the actual frequency of the motor flux truly corresponds to that of the desired stator excitation frequency $\hat{\omega}_e$.

From the foregoing description, it will be appreciated that in the system of FIG. 3, any difference between the desired stator excitation frequency and the actual motor flux frequency is amplified and added to the desired frequency signal to form the actual stator excitation frequency signal that controls the frequency of operation of inverter 11. By this means, the auto-sequential commutated controlled current inverter is forced to generate motor flux in the motor at the desired frequency, thus allowing the control strategy to effect stable control on the motor during both steady state and transient conditions. Without the addition of a transiently responsive compensating circuit such as is provided by the phase lock-loop converter 71, it might be possible for the motor flux to have a frequency different than that required for stability of operation. It will be appreciated, therefore, that in the system of FIG. 3, sensing of both the motor flux level and the motor flux frequency assures that the motor being driven will assume a commanded value of flux for a given operating condition.

Figure 4:
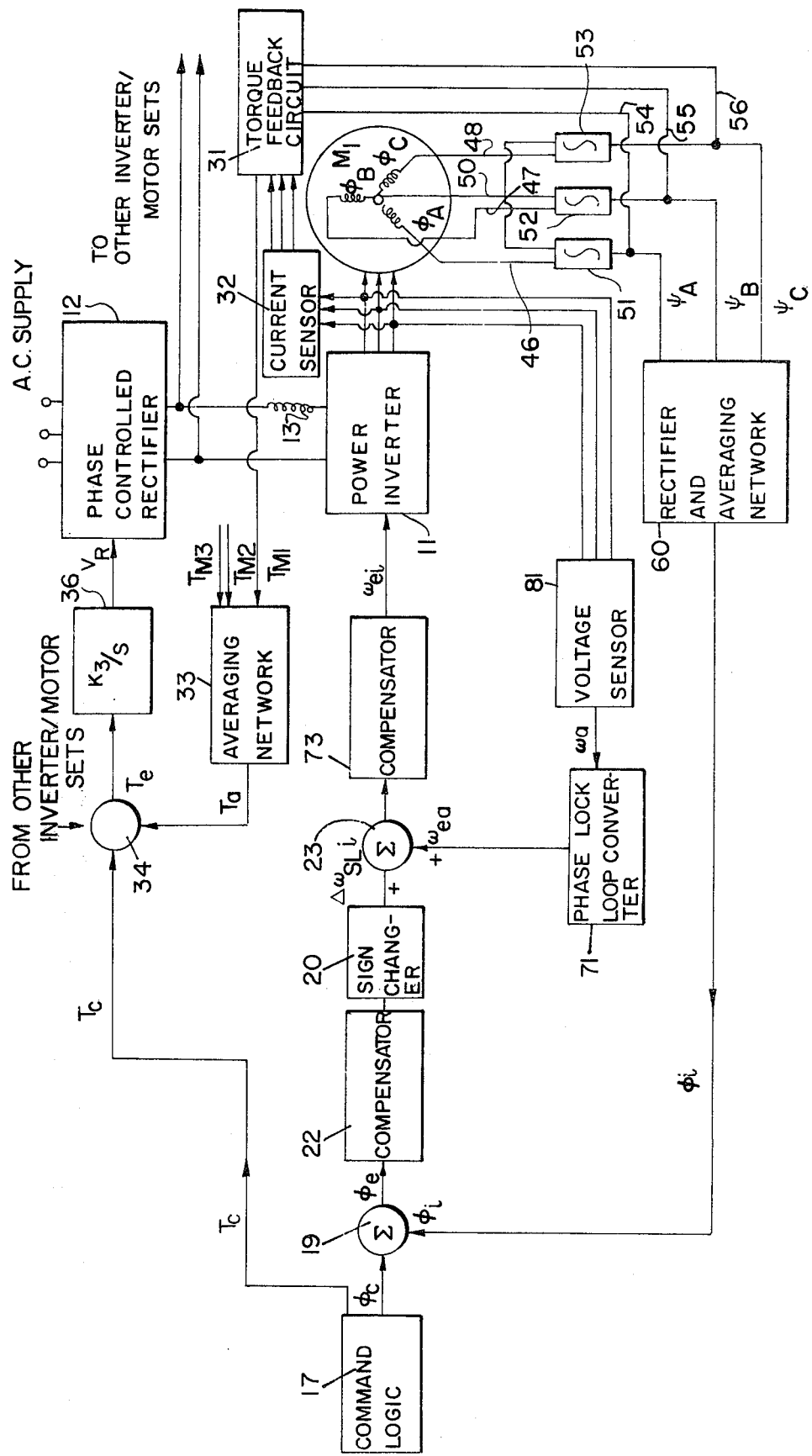
FIG. 4 is a schematic functional block diagram of a modified form of the embodiment of the invention shown in FIG. 2 wherein a phase lock-loop converter is employed in the frequency controlling feedback path of the system along with torque regulation of the common phase controlled rectifier.

FIG. 4 is a schematic functional block diagram of a modified form of a control system according to the invention which incorporates certain of the features illustrated in the systems shown in FIG. 2 and 3. In the FIG. 4 system, the output signal of the phase lock-loop converter 71, is representative of the actual frequency of the motor flux and acts in conjunction with the flux error signal $\phi_e$ independently of any motor speed sensor such as the tachometer generator 24 employed in the embodiments of the invention shown in FIG. 2 and 3. In the FIG. 4 embodiment, the phase lock-loop converter 71 is coupled to a voltage sensor 81 which in turn is connected to the output terminals of the inverter 11 to sense the frequency of the alternating current supplied to the stator of the motor $M_1$. The frequency of this alternating current generally corresponds to the frequency of the flux rotation in the stator-rotor gap inside the motor. If desired, the voltage sensor 81 can comprise a volts per hertz network. This connection is in contrast to the FIG. 3 arrangement wherein the feedback flux frequency signal was derived from the output of one or more of the actual motor flux sensing coils $\phi_A$, $\phi_B$, or $\phi_C$.

The frequency controlling channel of the system shown in FIG. 4 will function in a similar fashion to that described above with respect to FIG. 3 to provide an actual a-c frequency control signal $\omega_{ei}$ which varies with the sum of the output signal $\omega_{ea}$ of the phase lock-loop converter and a slip frequency deviation signal $\omega_{sli}$ derived from the flux error signal $\phi_e$. In steady state operation, since the motor flux frequency, under steady state conditions, is the same as the stator excitation current frequency, the signal $\Omega_{ei}$, which determines the frequency of operation of the autosequential commutated controlled current inverter 11, and the motor flux frequency indicating signal $\omega_{ea}$, have equal values, and the slip frequency deviation signal is zero. If the flux command or flux feedback signal were rapidly changed, the resulting deviation of value of the flux error signal would cause the frequency controlling signal $\omega_{ei}$ to transiently alter the actual excitation frequency with respect to the actual flux frequency by an amount which depends on the size of the deviation. It is understood corresponding frequency control channels are utilized in each of the other power inverter/motor sets employed in the drive system of FIG. 4.

In addition to the above distinguishing difference over the system of FIG. 3, it should be noted that the system of FIG. 4, like that of FIG. 2, employs a torque feedback circuit 31 in the regulating loop of the phase controlled rectifier 12 which in turn determines the magnitude of the direct current being supplied to all of the inverter/motor sets in the drive system. As explained more fully in the above referenced copending U.S. application Ser. No. 568,120, a considerable operating advantage is obtained by reason of the use of the torque feedback circuit 31 in the power regulating feedback path of the system. This is due to the fact that the torque feedback circuit 31 derives a torque feedback signal that more accurately reflects the actual value of the torque being developed by the induction motor in contrast to other forms of feedback circuits. Hence, a more accurate control is achieved over the torque being developed by all of the motors in the drive system. The torque feedback circuit 31 also could be employed in the system shown in FIG. 3 in place of the current sensing arrangement there shown with only slight modifications to the system of FIG. 3. In this manner the advantage of a torque feedback regulations of the current supplied by the controlled current inverters could be obtained along with all of the beneficial advantages described previously with relation to the sytem of FIG. 3.

Figure 5:
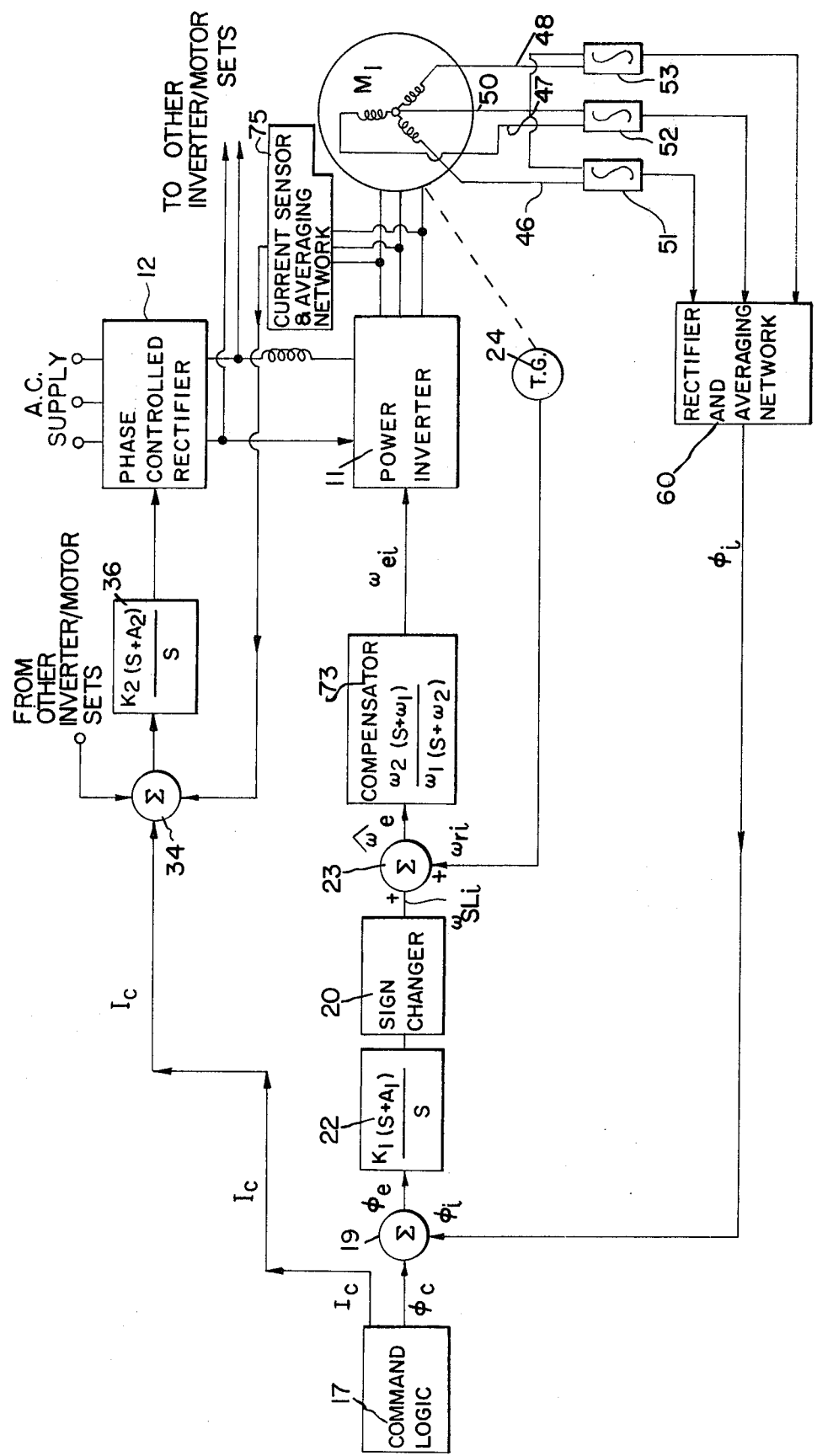
FIG. 5 is a schematic functional block diagram of still a different form of the invention employing an actual motor flux feedback signal used only in conjunction with a suitably designed compensating network to control the frequency of operation of the power inverter in each inverter-motor set of the system.

FIG. 5 is a schematic functional block diagram of still a different version of a new and improved induction motor control system according to the invention. In the embodiment of the invention shown in FIG. 5, the actual induction motor flux is again sensed and processed in a rectifier and averaging network 60 to derive a feedback, average, actual value of motor flux signal $\phi_i$ that is supplied to a summing circuit 19. Summing circuit 19 combines the actual value of flux feedback signal $\phi_i$ with a command value of flux control signal $\phi_c$, and it derives an output error signal $\phi_e$. Error signal $\phi_e$ is supplied through a compensator 22 to a sign changer 20 to provide an output slip frequency signal $\omega_{sli}$ representative of a desired value of motor $\omega_{sli}$. Motor slip signal $\omega_{sli}$ is supplied as one input to a second summing circuit 23 that has supplied to its second input an actual motor speed signal $\omega_{ri}$ that is combined with the slip frequency signal $\omega_{sli}$ to derive an uncompensated desired stator excitation frequency control signal $\hat{\omega}_e$. This signal is then supplied through a lead compensating circuit 91 to control the actual frequency of alternating current which the power inverter 11 supplies to the induction motor $M_1$. The lead compensator circuit 91 is a conventional lead network such as those described in the textbook, "Feedback Control System Analysis and Synthesis" by D'Azzo and Houpis - published by McGraw - Hill Book Co., 1960, and has designed into it the transfer characteristic $W_2(S+W_1)/W_1(S+W_2)$ as shown in FIG. 5. Thus the circuit 91 is effective in response to a rapid deviation of the flux error signal to alter the stator excitation frequency by an amount which depends on the rate of the deviation. Lead compensating circuit 91, as well as the other compensating circuits and the summing circuits employed in the various systems designed according to the invention, comprise conventional, commercially available integrated circuit operational amplifiers appropriately modified to provide the transfer function characteristics noted for each of the circuits in accordance with known feedback systems design technology.

From the foregoing description, it will be appreciated that the present invention provides new and improved methods and systems for improving the stability and operation of induction motor drive systems. The invention is particularly well adapted for use with variable speed, controlled current induction motor drive systems employing controlled current inverters. By reason of the invention, it is possible to provide a control system wherein a plurality of controlled current inverter/motor sets are excited from a single common phase controlled rectifier thereby achieving considerably economy in the design, construction, and operation of the rectifier. In practicing the invention it is preferred to employ a motor flux sensing arrangement wherein the actual value of the motor flux produced across the stator-rotor gap of the induction motor is sensed and is employed in controlling the frequency of the stator excitation current supplied to the induction motors by their associated controlled current inverters. It is also preferred to regulate the power or torque being developed by all of the motors in a drive system by including in the current controlling feedback path of a system a means for deriving an actual value of torque feedback control signal for controlling the magnitude of the direct current supplied to all of the inverters from a common phase controlled rectifier. Improved stability and control is achieved by the inclusion of a phase lock-loop converter and/or a lead compensating network in the frequency regulation feedback path of the control system for controlling the frequency of the excitation current supplied to each induction motor by its respective inverter.

Having described several embodiments of new and improved methods and systems for controlling operation of variable speed, controlled current inverter excited induction motor drive systems constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. A new and improved induction motor control system including in combination electric power conversion apparatus having input terminals adapted to be coupled to a source of electric energy and output terminals adapted to supply alternating current excitation to an induction motor at a desired stator excitation frequency, motor flux sensing means for deriving a first feedback signal representative of the magnitude of electromagnetic flux being developed across the stator-rotor gap of the induction motor, means for providing a first control signal representative of a desired value of flux, and flux regulating means coupled to said conversion apparatus and responsive to said feedback signal and said first control signal for controlling the frequency of the stator excitation alternating current supplied to the induction motor by said apparatus as necessary to minimize the difference between the value of said feedback signal and the value of said first control signal.

2. The induction motor control system according to claim 1 further including means for providing a second control signal representative of a desired value for a second preselected motor operating characteristic other than frequency, means for deriving a second feedback signal representative of the actual value of said second preselected motor operating characteristic and second regulating means coupled to said power conversion apparatus and responsive to said second feedback signal and said second control signal for varying the magnitude of the alternating current supplied to said induction motor by said apparatus as necessary to minimize the difference between the value of said second feedback signal and the value of the second control signal.

3. The induction motor control system according to claim 2 in which said second preselected operating characteristic is the magnitude of the alternating current being supplied to said motor by said apparatus.

4. The induction motor control system according to claim 2 in which said second preselected operating characteristic is the torque being developed by the induction motor.

5. An induction motor control system according to claim 1 wherein said electric power conversion apparatus comprises inverter means having its output coupled to and supplying the induction motor with alternating current and controlled magnitude direct current supply means for supplying controlled magnitude direct current to the input terminals of said inverter means.

6. An induction motor control system according to claim 5 wherein said induction motor is a variable speed induction motor, said inverter means comprises an autosequential commutated controlled current inverter having a variable frequency output, and the controlled magnitude direct current supply means comprises phase controlled rectifier means.

7. An induction motor control system according to claim 5 further including torque feedback circuit means responsive to the output from said motor flux sensing means and to the output from a current sensor for sensing the magnitude of the output current supplied from said inverter means to said induction motor, said torque feedback circuit means serving to derive a feedback actual value of torque signal, means for supplying a desired value of torque command input signal, torque summing circuit means responsive to said feedback actual value of torque signal and the desired value of torque command input signal for deriving an output torque error control signal, and means responsive to the output torque error control signal for controlling the magnitude of the direct current supplied to said inverter means by said controlled magnitude direct current supply means.

8. An induction motor system according to claim 1 wherein said flux regulating means comprises first summing circuit means responsive to said first feedback signal and to said first control signal for deriving an error signal representative of any difference therebetween and compensating circuit means responsive to a rapid deviation of the value of said error signal for transiently altering the frequency of the alternating current supplied to the induction motor in a manner which is a function of said deviation and which is in a direction and of a magnitude to overcome the deviation in a minimum period time of response.

9. An induction motor control system according to claim 8 wherein said compensating circuit means includes phase lock loop converter means operatively coupled to the induction motor for deriving a flux frequency feedback signal representative of the frequency of the rotation of the magnetic flux developed in said motor, and means responsive to said flux frequency feedback signal and said error signal for transiently altering the frequency of the alternating current supplied to the induction motor in a manner which depends on the size and direction of any rapid deviation of said error signal.

10. An induction motor control system according to claim 9 wherein said motor flux sensing means comprises means for sensing the actual electromagnetic flux being produced across the stator-rotor gap of the induction motor and said phase lock converter means is coupled to said motor flux sensing so that its output signal is determined by the frequency of rotation of said actual flux.

11. An induction motor control system according to claim 9 in which said phase lock loop converter means is coupled to the output terminals of said power conversion apparatus so that its output signal is determined by the frequency of the alternating current supplied to the induction motor.

12. The motor control system of claim 9 in which said flux regulating means further includes means for deriving a slip frequency deviation signal from said error signal and means providing a frequency controlling signal which varies with the sum of said phase lock loop converter output signal and said slip frequency deviation signal, said slip frequency deviation signal in steady state operation conditions being zero, and means for controlling the frequency of said alternating current in accordance with the value of said frequency controlling signal.

13. A motor control system according to claim 9 wherein said flux regulating means further includes motor speed sensing means for deriving a rotor speed signal representative of the actual speed of the motor, means for deriving a slip frequency signal from said error signal, means for providing a desired stator excitation current frequency signal which varies with the sum of said rotor speed signal and said slip frequency signal, said slip frequency signal being representative of the actual slip frequency in said motor and having a value which results in a minimum or zero error signal under steady state operating conditions corresponding to those commanded by the first control signal, means for deriving an actual alternating current frequency control signal from said desired stator excitation current frequency signal, means for controlling the frequency of the alternating current supplied to said induction motor in accordance with the value of said actual alternating current frequency control signal, and means for transiently modifying the value of said actual alternating current frequency control signal by an amount which depends on the difference between the value of said desired stator excitation current frequency signal and the value of said phase lock loop converter output signal.

14. An induction motor control system according to claim 8 in which said compensating circuit means comprises lead network means responsive to said error signal for transiently altering the frequency of said alternating current by an amount which depends on the time rate of change of any rapid deviation of said error signal.

15. An induction motor control system according to claim 14 wherein said flux regulating means further comprises motor speed sensing means for deriving a rotor speed signal representative of the actual speed of the motor, means for deriving a slip frequency signal from said error signal, means for providing a desired stator excitation frequency signal which varies with the sum of said rotor speed signal and said slip frequency signal, said slip frequency signal in steady state operation being representative of the actual slip frequency in said motor and having a value which results in a minimum or zero error signal under steady state operating conditions corresponding to those commanded by the first control signal, means including said lead network means for deriving an actual alternating current frequency control signal from said desired stator excitation frequency signal, and means for controlling the frequency of the alternating current supplied to the induction motor in accordance with the value of said actual alternating current frequency control signal.

16. An induction motor control system according to claim 1 wherein the motor flux sensing means comprises means for sensing the actual electromagnetic flux being produced across the induction motor stator-rotor gap and for deriving a feedback sensed actual flux signal representative thereof for supply to an input of the flux regulating means.

17. A new and improved induction motor control system including in combination a plurality of alternating current induction motors, respective inverter means coupled to and supplying each of said induction motors with excitation alternating current, common direct current power supply means, direct current coupling circuit means for coupling direct current from said common direct current power supply means to the input of the respective inverter means, said direct current coupling circuit means including individual isolating choke inductors for isolating each inverter means from the others and from the common direct current power supply at alternating current frequencies, common power control means for controlling the magnitude of the direct current supplied from said common direct current power supply means to all said inverter means, respective motor flux sensing means for each of said induction motors for deriving individual feedback control signals representative of the flux developed by the respective induction motors, means for supplying an operator controlled first input control signal representative of a desired value of motor flux for each induction motor, respective flux summing circuit means responsive to the respective motor flux sensing means and respective first input control signals for deriving individual error control signals for regulating the flux level of the respective induction motors, and respective, compensating circuit means coupled to the outputs of said respective summing circuit means and to the frequency controlling inputs of the respective inverter means for individually controlling the frequency of the stator excitation alternating current supplied to the respective induction motors by their associated inverter means in a manner to minimize the individual output error control signals from the respective summing circuit means.

18. An induction motor control system according to claim 17 wherein the respective motor flux sensing means comprise means for sensing the actual electromagnetic flux being produced across the associated respective induction motor stator-rotor gap and for deriving a feedback sensed actual flux signal representative thereof for supply to one of the inputs of the respective summing circuit means.

19. An induction motor control system according to claim 18 wherein the inverter means each comprises an auto-sequential commutated controlled current inverter and the common direct current power supply means comprises common phase controlled rectifier means having input terminal means for connection to an alternating current source of electric energy and the power control means controls the point in the phase of the supply alternating current power at which the common phase controlled rectifier means turns on to thereby control the magnitude of the direct current supplied from the output of the common phase controlled means to all of the inverters.

20. The induction motor control system according to claim 19 wherein each inverter is further provided with means for providing a second control signal representative of a desired value for a second preselected motor operating characteristic other than frequency, means for deriving a second feedback signal representative of the actual value of said second preselected operating characteristic, and second regulating means coupled to said common phase controlled rectifier means and responsive to said second feedback signal and said second control signal for varying the magnitude of the alternating current supplied to said induction motor by said common phase controlled rectifier in a manner to minimize the difference between the value of said second feedback signal and the value of the second control signal.

21. The induction motor control system according to claim 20 in which said preselected operating characteristic is the magnitude of the alternating current being supplied to all said inverters by said common phase controlled rectifier means.

22. The induction motor control system according to claim 20 in which said preselected operating characteristic is the actual torque being developed by the induction motors.

23. An induction motor control system according to claim 22 wherein said means for deriving a second feedback signal comprises respective torque feedback circuit means for each induction motor, each torque feedback circuit means being responsive to the output from said motor flux sensing means and to the output from a current sensor for sensing the magnitude of the output current supplied from each inverter to its respective induction motor, and means for providing a second control signal comprises common torque command means for supplying a desired value of torque command input signal, and common torque signal summing circuit means responsive to all said torque feedback circuit means and to said common torque command means for deriving an output torque error control signal for controlling said common phase controlled rectifier means.

24. An induction motor control system according to claim 23 wherein each induction motor comprises a variable speed, variable current induction motor and wherein each of said compensating circuit means includes motor speed sensing means coupled to a respective induction motor for sensing the actual speed of the rotor of the motor, first compensator means coupled to the output from said flux summing circuit means for deriving from said error control signal a slip frequency signal representative of a desired value of motor slip form the respective induction motor, second summing circuit means responsive to the outputs from said first compensator means and from said speed sensing means for deriving a desired stator excitation current frequency, and means responsive to said second summing circuit means for controlling the frequency of the respective power inverter.

25. An induction motor control system according to claim 17 wherein each induction motor comprises a variable speed, variable current induction motor and wherein each of said compensating circuit means includes motor speed sensing means coupled to a respective induction motor for sensing the actual speed of the rotor of the motor, first compensator means coupled to the output from said flux summing circuit means for deriving from said error control signal a slip frequency signal representative of a desired value of motor slip for the respective induction motor, second summing circuit means responsive to the outputs from said first compensator means and from said speed sensing means for deriving a desired stator excitation current frequency, and means responsive to said second summing circuit means for controlling the frequency of the respective power inverter.

26. An induction motor control circuit according to claim 17 wherein each induction motor comprises a variable speed, variable current induction motor and wherein each compensating circuit means includes phase lock-loop converter means operatively coupled to a respective induction motor for deriving a flux frequency feedback signal representative of the frequency of rotation of the magnetic flux developed in said motor, and means responsive to said flux frequency feedback signal and said error control signal for transiently altering the frequency of the alternating current supplied to the induction motor in a manner which depends on the size and direction of any rapid deviation of the error control signal.

27. A motor control system according to claim 26 wherein each of said compensating circuit means further includes motor speed sensing means for deriving a rotor speed signal representative of the actual speed of each respective motor, means for deriving a slip frequency signal from the error control signal for the respective motor, means for providing a desired stator excitation current frequency signal which varies with the sum of said rotor speed signal and said slip frequency signal, said slip frequency signal being representative of the actual slip frequency in said motor and having a value which results in a minimum or zero error signal under steady state operating conditions corresponding to those commanded by the first input control signal, means for deriving an actual alternating current frequency control signal from said desired stator excitation current frequency signal, means for controlling the frequency of the alternating current supplied to said induction motor in accordance with the value of said actual alternating current frequency control signal, and means for transiently modifying the value of said actual alternating current frequency control signal by an amount which depends on the difference between the value of said desired stator excitation current frequency signal and the value of said phase lock-loop converter output signal.

28. The motor control system of claim 26 in which said compensating circuit means includes means for deriving a slip frequency deviation signal from said error control signal for a respective motor and means providing a frequency controlling signal which varies with the sum of said phase lock loop converter output signal and said slip frequency deviation signal, said slip frequency deviation signal in steady state operation conditions being zero, and means for controlling the frequency of the alternating current supplied by the inverter of the respective motor in accordance with the value of said frequency controlling signal.

29. An induction motor control system according to claim 17 in which said compensating circuit means for each respective motor comprises lead network means responsive to the error control signal for the respective motor for transiently altering the frequency of the alternating current supplied to the motor by an amount which depends on the time rate of change of any rapid deviation of the error control signal.

30. An induction motor control system according to claim 29 wherein said compensating circuit means further comprises motor speed sensing means for deriving a rotor speed signal representative of the actual speed of the motor, means for deriving a slip frequency signal from said error control signal, means for providing a desired stator excitation frequency signal which varies with the sum of said rotor speed signal and said slip frequency signal, said slip frequency signal in steady state operation being representative of the actual slip frequency in said motor and having a value which results in a minimum or zero error signal under steady state operating conditions corresponding to those commanded by the first input control signal, means including said lead network means for deriving an actual alternating current frequency control signal from said desired stator excitation frequency signal, and means for controlling the frequency of the alternating current supplied to the induction motor in accordance with the value of said actual alternating current frequency control signal.

31. An improved method of controlling operation of at least one alternating current induction motor with a power converter having separate power and frequency controlling means including at least one inverter for converting direct current electric power into alternating current for exciting the induction motor, said method comprising deriving a feedback motor flux signal representative of the magnitude of motor flux produced in the induction motor and feeding back the motor flux signal thus derived to control the frequency of operation of the inverter.

32. The method of controlling an induction motor according to claim 31, wherein the signal representative of the magnitude of flux produced in the induction motor is derived by sensing the actual electromagnetic flux produced across the rotor-stator gap of the induction motor.

33. The method of controlling an induction motor according to claim 32, further including varying the magnitude of the direct current supplied to the inverter to thereby control the torque developed by the motor.

34. The method of controlling an induction motor according to claim 33, wherein the direct current is produced by phase controlled rectification of alternating current power supplied from an alternating current power source.

35. The method of controlling an induction motor according to claim 34 further comprising deriving a second feedback signal representative of the value of a second preselected motor operating characteristic other than frequency, supplying an input control signal representative of a desired value for the second preselected motor operating characteristic, combining the second feedback signal with the input control signal representative of a desired value for the second preselected motor operating characteristic to derive an error control signal, and controlling the phase controlled rectification with the error control signal in a manner to minimize its value and maintain it at zero in a minimum time period of response.

36. The method of controlling an induction motor according to claim 35 wherein the second preselected motor operating characteristic is the magnitude of the stator excitation current supplied to the motor by the inverter.

37. The method of controlling an induction motor according to claim 35 wherein the second preselected motor operating characteristic is the actual torque being developed by the motor.

38. The method of claim 31 applied to a plurality of induction motors, wherein a plurality of power inverters are provided for supplying alternating currents to the respective induction motors being controlled, and wherein direct currents are supplied to all the inverter/motor sets in parallel from a commonly controlled source, and coupling between the several inverter/motor sets is minimized.

39. The method of controlling a plurality induction motors according to claim 38 further comprising deriving a plurality of second feedback signals representative of the values of a second preselected motor operating characteristic other than frequency, supplying an input control signal representative of a desired value for the second preselected motor operating characteristic for all of the motors, combining the second feedback signals with the input control signal representative of a desired value for the second preselected motor operating characteristic to derive a common error control signal, and commonly controlling the source of direct current supplied to all the inverter/motor sets with the error control signal in a manner to minimize the values of the error signal in a minimum time period of response.

40. The method of controlling a plurality of induction motors according to claim 39 wherein the second preselected motor operating characteristic is the magnitude of the stator excitation current supplied to each motor by its associated power inverter.

41. The method of controlling a plurality of induction motors according to claim 39 wherein the second preselected motor operating characteristic is the actual torque being developed by the motors.

42. The method of controlling a plurality of induction motors according to claim 41 wherein said direct currents are produced by common phase controlled rectification of an alternating current power supply and further comprising deriving from the motor flux signal and from a sensed value of induction motor stator excitation current signal, a feedback actual value of torque signal for controlling the phase controlled rectification of the supply of alternating current power and hence the magnitude of direct current supplied to all the power inverters.

43. The method of controlling an induction motor according to claim 31, further including sensing the actual speed of the rotor of the induction motor, deriving a feedback phase lock frequency control signal representative of the frequency of rotation of the magnetic flux developed in the induction motor, combining the sensed actual speed signal and the feedback phase lock frequency signal to derive an error signal, and transiently altering the frequency of the alternating current supplied to the induction motor in a manner which depends on the size and polarity of any rapid deviation of said error signal in order to minimize the same.

44. The method of controlling an induction motor according to claim 43 wherein the feedback phase lock frequency control signal is derived from the sensed actual electromagnetic motor flux signal produced across the rotor-stator gap of the induction motor.

45. The method of controlling an induction motor according to claim 43, wherein the feedback phase lock loop frequency control signal is derived by voltage sensing the excitation current frequency at the output of the power inverter.

46. The method of controlling an induction motor according to claim 31 further comprising combining the feedback motor flux signal with an input command value of motor flux signal to derive an error signal and transiently altering the frequency of the alternating current supplied to the induction motor from the inverter by an amount and in a direction which depends on the time rate of change of any rapid deviation of the error signal.

47. The method of controlling an induction motor according to claim 46 further including sensing the actual speed of the rotor of the induction motor, combining the feedback motor flux signal with an input command value of motor flux signal and deriving a motor slip frequency signal, said slip frequency signal in steady state operation being representative of the actual slip frequency in said motor, and having a value which results in a minimum or zero error signal under steady state operating conditions corresponding to those commanded by the input command value of motor flux signal, combining the sensed actual speed signal with the motor slip frequency signal to derive a desired stator excitation frequency, and producing an actual alternating current frequency control signal for controlling of the induction motor from said desired stator excitation frequency signal.

* * * * *

UNITED STATES PATENT OFFICE
CERTIFICATE OF CORRECTION

PATENT NO. : 4,044,285
DATED : August 23, 1977
INVENTOR(S) : AB Plunkett; JD D'Atre It is certified that error appears in the above-identified patent and that said Letters Patent are hereby corrected as shown below:

Column 20, line 65, insert "rectifier" between "controlled" and "means"

Column 21, line 32, delete "and" and substitute -- said --

Signed and Sealed this

Twentieth Day of December 1977

[SEAL]

Attest:

RUTH C. MASON
Attesting Officer

LUTRELLE F. PARKER
Acting Commissioner of Patents and Trademarks